United States Patent [19]

Free

[11] 3,814,521

[45] June 4, 1974

[54] OBJECT RECOGNITION

[75] Inventor: John Marshall Free, Montclair, N.J.

[73] Assignee: Hoffmann-LaRoche Inc., Nutley, N.J.

[22] Filed: Sept. 12, 1972

[21] Appl. No.: 288,464

[52] U.S. Cl. .................. 356/156, 356/167, 356/256

[51] Int. Cl. .......................................... G01b 11/00

[58] Field of Search ............. 356/71, 120, 156, 167, 356/200, 237, 256, 171

[56] References Cited

UNITED STATES PATENTS

| | | | |
|---|---|---|---|
| 2,867,149 | 1/1959 | Goddard | 356/120 |
| 3,314,328 | 4/1967 | Boettcher | 356/120 |

OTHER PUBLICATIONS

Hammond et al., IBM Technical Disclosure Bulletin, Vol. 14, No. 1, June 1971, pages 49 and 50.

*Primary Examiner*—Ronald L. Wibert
*Assistant Examiner*—F. L. Evans
*Attorney, Agent, or Firm*—Samuel L. Welt; Bernard S. Leon

[57] ABSTRACT

An optical apparatus and method for recognition of three-dimensional objects comprising an uneven illumination to project a striated pattern of illuminated and non-illuminated areas on the object which is scanned along a plurality of successive scan lines for generating video data which is compared with reference data for object recognition purposes.

7 Claims, 6 Drawing Figures

OBJECT RECOGNITION

BACKGROUND OF THE INVENTION

1. Field of the Invention — The present invention relates to the field of optical recognition, and, more particularly, to a method and apparatus for recognition of an object shape.

2. Description of the prior art — Many techniques have been employed for monitoring objects for a variety of purposes. For example, it is found to be expedient to view articles in assembly lines to ascertain defects for rejection purposes, by visual inspection and automatically by ultrasonic and optical techniques for a variety of purposes (e.g., to detect product impurities, color variations, flaws, etc.).

SUMMARY OF THE INVENTION

The present invention is related to an optical method and apparatus for position independent object recognition by utilization of uneven illumination. Specifically, the above is accomplished by projecting a striated pattern on a surface or surfaces of an object to be recognized. Knowing the direction of illumination and of view, the apparent spacing (and direction) of the striations is related geometrically to the direction of the surface of the object whereby the number of striations of a given measure offer a statement of how much of the surface of the object lies in a given direction and is determinative of the shape of the object for recognition purposes. This may be accomplished independent of the object size and orientation, if desired.

SPECIFIC EMBODIMENT OF THE INVENTION

Figure 1:
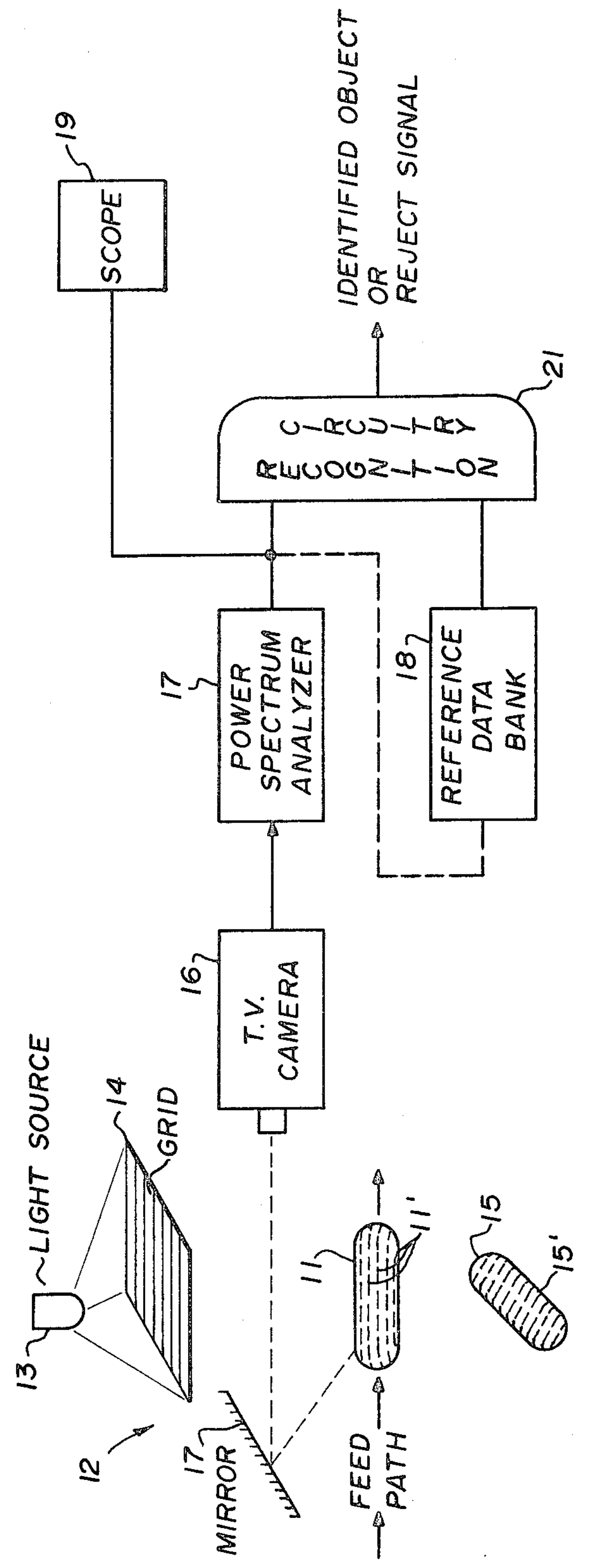
FIG. 1 is a schematic block diagram of an object recognition system in accordance with the present invention.

With reference to the figures there is shown in FIG. 1 an object 11 such as a capsule which is being fed along a feed path and illuminated at a monitoring station generally denoted as 12 including a light source 13 and a grid 14 disposed between the light source and the feed path. As illustrated, grid 14 is of a configuration having a series of parallel slits to, in effect, image or project a striated pattern of dark parallel lines, by way of a shadow effect, on a surface or surfaces of the capsule 11 being conveyed by way of the feed path.

Assuming the horizontal axis of the elipsoidal-like capsule 11 to lie parallel to the slits of grid 14, the black shadow lines illustrated as 11′, will be imaged on the curved surface of the capsule. A capsule 15 of the irregular shape or one that might be, for example, twisted at an angle of 45° with reference to the direction of feed, is illustrated at monitoring station 12 to have a shadow pattern 15′ which, of course, differs from that shown at 11′ due to the shape variation of the capsule as a consequence of its being distorted or twisted. As is readily evident the irregularity causes a resultant pattern which is distinct from a pattern 11′.

A TV camera 16, which might be a vidicon tube or similar type unit, is employed to view and/or scan a field at the monitoring station containing the imaged striated pattern, by way of a mirror 17 for convenience, which pattern is imparted to the capsules 11 and 15 being fed past the monitoring station at separate times. At this point, it is noted that it may be expedient to provide a completely black background in scanning the capsule at the monitoring station for enhancing signal differentiation.

The TV camera connected to a power spectrum analyzer 17 in which the video signal from the TV camera, which is being received on a current versus time basis, will provide an indication on a frame-by-frame or other basis, of a power versus frequency analysis. This, in effect, provides an indication of the duration that a scanning spot traverses lines of a given spacing effected by the imaged striated pattern and object position. This will among other things indicate how much surface area of the object being scanned lies in or faces a certain direction.

A reference data bank 18 is provided for storage of permanent reference pattern or patterns which may be acceptable and are to serve as basis for comparison. This may be effected by several ways one of which is to provide a duplicate TV camera system which scans an ideal object to be recognized or accepted. Another is to initially scan an ideal object with a TV camera 16 and insert this information with predetermined instructions as is known in the field, via the power spectrum analyzer 17 into a set of circuit logic incorporated in the reference data bank 18 as is depicted by the dashed line 19. The circuit logic, of course, as is well known may be weighted to allow for preselected variations acceptable in the field and to tolerate to various degree errors whose consequences having varying significance.

The output of the power spectrum analyzer may be fed to a oscilloscope 19 at which the frame-by-frame analysis may be visually observed and, if desired, compared with an overlay for object identification and/or reject purposes. This may be automatically achieved by simultaneously feeding the outputs from the power spectrum analyzer 17 and the reference data bank 18 to recognition circuitry 21, as is conventional in the field and which may include a comparator, for object identification or reject purposes.

Figure 2:
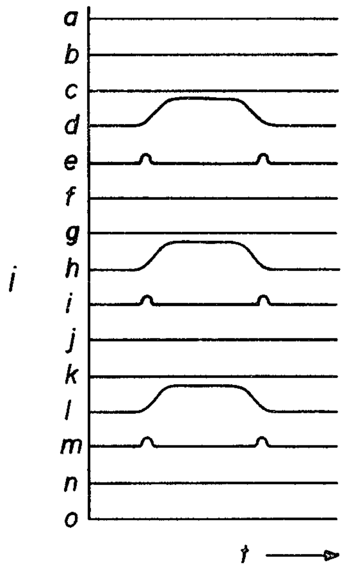
FIG. 2 is a current versus time waveform diagram representative of a line by line scan parallel with the feed path of object 11.
Figure 3:
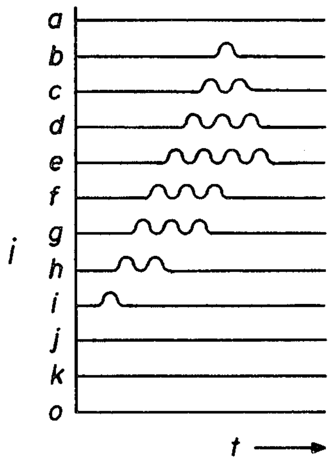
FIG. 3 is a current versus time waveform diagram representative of a line by line scan parallel with the feed path object 15.

In operation, with reference to FIGS. 1 through 4, there is shown in FIGS. 2 and 3 a representation of a line-by-line scan parallel to, i.e., in directions parallel to the feed path of objects 11 and 15. As is depicted in FIG. 2, the main portions of the three imaged horizontal lines 11′ are denoted by the scan lines *d*, *h* and 1, whereby the slightly curved ends of the imaged lines 11′ are denoted by the scan lines *e*, *i* and *m*. Assuming object 15 at the same location as object 11 with the same scanned pattern at first one of imaged lines 15′ would first be traversed by the scanning beam as is shown at FIG. 3 at scanning line *b*, whereby scan line *c* might intercept two imaged lines, scan line *d* intercept three imaged lines etc., as the scanning line is stepped vertically downward in the direction perpendicular to the feed path.

Figure 4:
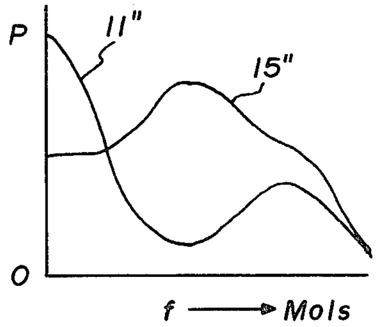
FIG. 4 illustrates separate graphic representations of power versus frequency analyses of the video signals scanned from objects 11 and 15 during the frame periods as defined in FIGS. 2 and 3.

The resultant output, on a frame by frame basis, of current versus time signal of object 11 fed into the power spectrum analyzer 17 might be denoted as 11″ at FIG. 4 as the video frequency scanning beam at object 11 would have a low frequency modulation content. On the other hand, the power spectrum analyzer output of the video frequency scan beam cross object 15 would have a higher frequency modulated content as is illustrated as 15″ in FIG. 4. Since the waveform pattern denoted by 11″ with certain allowable deviations, would in the particular case at hand generally indicate an acceptable capsule pattern, the pattern 15″ would obviously be indicative of an unacceptable capsule pattern resulting from its twisted position or distorted configuration, which object 15 might be rejected.

ALTERNATIVE EMBODIMENTS

Figure 5:
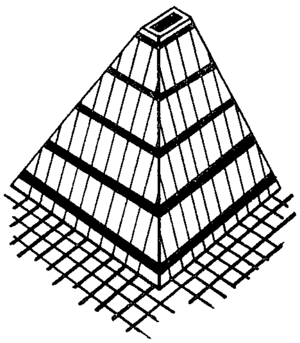
FIG. 5 is a perspective view conveying the effect of projecting the image of a pattern of uniformly spaced parallel and perpendicular lines to define a cross-hatched grid, onto a pyramidal object.
Figure 6:
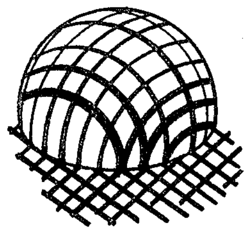
FIG. 6 is a perspective view conveying the effect of projecting the image of a cross-hatched grid onto a hemispherical object.

It should be understood that the methodology underlining the embodiment described above could be utilized with substantial variations and for different purposes. This is so as the imaged pattern on the face(s) of the three-dimensional object is distorted in a way that allows for measurement of the tilt, curvature, size and definition of that surface. For example, such a striated imaged pattern imparted by a cross-hatched grid to a pyramidal object, as illustrated at FIG. 5, or hemispherical object, as illustrated at FIG. 6, may be implemented to sharply delineate the edges of an object by the above changes and in particular by the sharp changes in the direction of the imaged lines or as viewed from the power spectrum analyzer 17. In addition, corners, dents, breaks, etc., could also be readily identified.

It should also be understood, of course, that the grid projector encompassing a light illumination source 13 and grid 14 could take on a number of varied configurations which would depend, of course, upon the object shapes to be identified and/or rejected, the resolution desired, and/or the amount of object surface area to be monitored for ascertaining, for example, how an object on a production line might be oriented, shaped and; or sized.

Other variations of the present invention might include: analysis of a video signal by other than a power spectrum analyzer, and; illumination and/or viewing the object by means of flying spot scanners or the interference of light. Such other instrumentation to perform the video signal analysis might include a phase analyzer, integration units, etc.

I claim:

1. Apparatus for recognizing an object comprising:
means for providing uneven illumination of an object to project on the object a striated image pattern having illuminated areas and non-illuminated areas;
means for scanning said object along a plurality of successive scan lines and generating viedo signals characteristic of said pattern areas imaged on the object;
recognition means responsive to said video signals to provide in response to the frequency of occurrence of the striated pattern, an indication of object recognition.

2. Apparatus according to claim 1 wherein said uneven illumination means comprises:
light source means; and
grid means disposed between said light source means and the object to be illuminated.

3. Apparatus according to claim 2 wherein said grid means causes a striated pattern to be projected on said object.

4. Apparatus according to claim 1 wherein said recognition means includes:
means for analyzing said video signals; and
means for comparing the analyzed signals with a standard for identifying said object.

5. Apparatus according to claim 4 wherein said analyzing means comprises a power spectrum analyzer.

6. Apparatus according to claim 1 wherein said scanning means provides for generating said signals characteristic of the image pattern on said object when in transit.

7. A method for recognizing an object comprising:
projecting an uneven illumination to define a pattern of alternating illuminated and non-illuminated areas on an object;
scanning the object along a plurality of successive scan lines and generating object data characteristic of the frequency of occurrence said pattern areas on said object;
providing reference data representative of an item to be identified;
comparing said object data with said reference data to provide an indication of recognition of the object.

* * * * *